UNITED STATES PATENT OFFICE.

ANSIL MOFFATT, OF INDIANAPOLIS, INDIANA.

PROCESS OF MAKING HYDROSULFIDS.

SPECIFICATION forming part of Letters Patent No. 648,772, dated May 1, 1900.

Application filed January 6, 1899. Serial No. 701,873. (No specimens.)

*To all whom it may concern:*

Be it known that I, ANSIL MOFFATT, a citizen of the United States, residing at Indianapolis, in the county of Marion and State of Indiana, have invented certain new and useful Improvements in Processes of Producing Hydrosulfids, of which the following is a specification.

This invention relates to a new and useful process for producing hydrosulfids of alkaline-earth metals in solution from materials easily transported or stored.

Heretofore in the manufacture of hydrosulfids it has been customary to pass sulfureted hydrogen into a solution of the hydroxids of alkaline-earth metals or over the moistened hydroxies until saturation took place.

My new process consists in mixing the soluble salts of magnesium with sulfids of alkaline-earth metals—such as barium, calcium, or strontium—in the proportions of one equivalent of the magnesium to two equivalents of the alkali-earth-metal sulfid, whereby in the presence of water at common temperatures the following general reaction takes place:

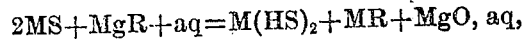

$$2MS + MgR + aq = M(HS)_2 + MR + MgO, aq,$$

in which M equals the sulfur equivalent of alkaline earth and R equals any acid element or radical, according to the usage of chemical nomenclature.

It will be seen from the above equation that one half the alkaline-earth metal present unites with the acid element or radical of the magnesium, while the remaining half of the alkaline-earth metal unites with the sulfur and the hydrogen set free by assimilation of the water present, while the magnesium is converted into magnesium hydroxid. A more specific illustration is shown in the reaction of calcium sulfid and magnesium sulfate, which are, generally speaking, the most desirable reacting materials.

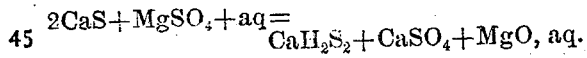

$$2CaS + MgSO_4 + aq = CaH_2S_2 + CaSO_4 + MgO, aq.$$

In any case the reaction occurs in accordance with Berthollet's law, that where reacting bodies are brought together in solution if an insoluble or difficultly-soluble body can be formed it will be formed and the attendant reactions will also take place. Here the reacting bodies are CaS, a soluble body; $MgSO_4$, a soluble body, which by reaction forms the difficultly-soluble body $MgO, aq$, (or $MgH_2O_2$, aq,) and the attendant bodies $CaH_2S_2$ and $CaSO_4$.

The solutions of the hydrosulfids of any alkaline-earth metal are not suitable for transportation or storage and should be used on the spot where made. The ingredients, however—such as calcium sulfid, &c., and magnesium sulfate, chlorid, &c.—are readily transported in a dry state, thus saving freight charges, and may be stored indefinitely without change in proper vessels. My invention therefore includes a mechanical mixture of the dry sulfid of an alkaline-earth metal—such as calcium, barium, or strontium—and a dry salt of magnesium in the proportion essentially of two equivalents of sulfid to one of magnesium salt, and such dry mixture will be suitable for shipment and storage and will be readily prepared for use by mere mixture with water at the point of consumption, and therefore is a practicable article of commerce, a property not possessed by the dissolved or wet hydrosulfid or mixture.

The solutions of the hydrosulfids are designed to be used for removing hair from hides and for other purposes to which hydrosulfids are applicable. The solution may be made at any tannery or other place where it is desired to use it by simply dissolving the ingredients in water and mixing and allowing to react an hour or so, when it will be ready for use.

The hydrosulfids themselves are unstable bodies, rapidly losing their sulfureted hydrogen by exposure and becoming caustic, and are not practically recoverable from solutions and are not therefore suitable articles of commerce. Attention is called to the fact that the metals suitable for reaction with magnesium salts must all form soluble hydroxids and hydrosulfids. That this is a necessary qualification is seen from the typical equations here given, where the reaction depends on the comparative insolubility of magnesium hydroxid.

Since the metals of the alkaline earths—such as barium, strontium, and calcium—are metals having soluble hydroxids and hydrosulfids, the sulfids of such metals are practically available. These characteristics, as stated, permit the formation of hydrosulfids in solution by reaction in presence of water of such sulfids with one-half equivalent of magnesium salt in accordance with Berthollet's law.

Having thus fully described my invention, what I claim as new, and wish to secure by Letters Patent of the United States, is—

The process of producing, in solution, a hydrosulfid of an alkaline-earth metal, consisting in mixing two equivalents of the sulfid of an alkaline-earth metal with one equivalent of a magnesium salt, substantially in accordance with the following equation:

$$2MS + MgR + aq = M(HS)_2 + MR + MgO, aq.$$

In witness whereof I have hereunto set my hand and seal, at Indianapolis, Indiana, this 3d day of January, A. D. 1899.

ANSIL MOFFATT. [L. S.]

Witnesses:
 JOSEPH A. MINTURN,
 CARL SCHLEGEL.